United States Patent [19]

Apple, Jr. et al.

[11] 3,873,920

[45] Mar. 25, 1975

[54] VARIABLE BLOCK LENGTH SYNCHRONIZATION SYSTEM

[75] Inventors: Garrett Gordon Apple, Jr., Worthington, Ohio; Yau Chau Ching, Morganville, N.J.

[73] Assignee: Bell Telephone Laboratories, Incorporated, Murray Hill, N.J.

[22] Filed: Dec. 12, 1973

[21] Appl. No.: 426,631

[52] U.S. Cl......... 325/41, 178/69.5 R, 179/15.55 R, 325/58, 340/146.1 D

[51] Int. Cl............................................... G08c 25/00

[58] Field of Search............ 325/41, 58; 178/69.5 R; 179/15.55 R; 340/146.1 D

[56] References Cited

UNITED STATES PATENTS

| | | | |
|---|---|---|---|
| 3,340,505 | 9/1967 | Scott | 325/41 |
| 3,475,724 | 10/1969 | Townsend et al. | 325/41 |

*Primary Examiner*—Malcolm A. Morrison
*Assistant Examiner*—Errol A. Krass
*Attorney, Agent, or Firm*—John Francis Moran; John K. Mullarney

[57] ABSTRACT

Framing or block synchronization of digital information signals grouped in blocks of variable length is provided by preceding each block with a synchronization code word. Each synchronization code word is error correction encoded in accordance with a BCH code to indicate the number of information bits in the following block and, hence, the location of the next succeeding synchronization code word. Since only the synchronization code words are error correction encoded, they can be distinguished from the information bits to obtain synchronization. A synchronization receiver acquires synchronization upon the occurrence of an error-free synchronization code word in the incoming signal. Synchronization is maintained thereafter by utilizing the inherent error correction capability offered by the BCH code to correct up to two errors in each received synchronization code word before decoding it to locate the next synchronization word. If, however, three errors are detected in a received synchronization word, synchronization is assumed to be lost and synchronization is thereafter recovered with the occurrence of a succeeding error-free synchronization code word in the incoming digital signal. Two receiver embodiments are disclosed which perform the above-described operation. The first embodiment is adapted to perform a general type of framing synchronization, while the other embodiment is specifically adapted to provide video synchronization.

8 Claims, 7 Drawing Figures

VARIABLE BLOCK LENGTH SYNCHRONIZATION SYSTEM

BACKGROUND OF THE INVENTION

This invention relates to digital information processing and communication systems and, more particularly, to synchronization arrangements for such digital systems wherein the information signals are grouped into blocks in which the number of signals contained therein varies randomly among successive blocks.

A common method of providing transmitter and receiver synchronization is to mark the beginning of each sequence of information signals with some distinctive sequence of symbols, known as a synchronization word, which is not used for message information. Such a technique is commonly called "framing synchronization". This method of synchronization is usually employed when the sequences of information signals are in groups of invariable predetermined length. The receiver therefore utilizes the fixed spacing between the synchronization words in examining the incoming bit stream for newly received synchronization words to maintain synchronization.

In certain applications, information signals are processed to remove redundant information. Accordingly, the number of new digital signals required to update a fixed portion of information can vary. For example, the transmission of video signals, such as PICTUREPHONE, by a redundancy reduction encoder can require anywhere from no information bits to a complete line of information bits to update a video line. The number of information bits for updating is dependent upon the amount of redundancy present and the efficiency of the encoding process in removing the redundant information from each video line. Framing synchronization in such a system is more difficult to achieve since the receiver cannot rely on a fixed spacing in examining the digital bit stream to find the synchronization words. Accordingly, one solution would be to impart the location of the next succeeding synchronization word in each synchronization word, while somehow maintaining the distinctive characteristic of each synchronization word. This is difficult to achieve without constraining the random nature of the block length variations in the message information. Such constraints are undesirable since the transmission efficiency is reduced and the complexity of encoding equipment is often increased. Without a distinctive characteristic in each synchronization word, the ability to acquire initial synchronization, to maintain synchronization, to detect loss of synchronization, and to reacquire synchronization cannot be accomplished by the receiver unless all the synchronization words can be positively identified and located in the bit stream that contains predominately message information.

SUMMARY OF THE INVENTION

It is, accordingly, a primary object of the present invention to provide a framing synchronization arrangement which can be utilized in framing information signals of highly variable block length.

It is a related object of the invention to provide a distinctive set of synchronization words that indicate the location of the next succeeding synchronization word in a bit stream containing predominately message information of randomly variable length blocks which do not exceed a predetermined maximum length.

A further object of the invention is to advantageously combine the inherent features of error correction coding technology with framing techniques to provide a highly flexible efficient and reliable framing synchronization system.

The digital output of a redundancy reduction encoder is delivered to a framing synchronization system, in accordance with the invention, in groups known as frames or blocks of highly variable length up to a specified maximum. Each block is stored and the number of bits contained therein is indicated by the output of a counter. The output of the counter is then further encoded into a cyclic error correction code word, with the first bit inverted. A so-called class of Bose-Chaudhuri-Hocquenghem (BCH) codes is ideally suited for providing the cyclic code word. This cyclic code word is transmitted to mark the beginning of each block of information signals, serving as a synchronization code word and indicating the bit length of the following block of message information. Accordingly, each synchronization code word also indicates the location of the next succeeding synchronization code word in the transmitted bit stream.

To obtain initial synchronization acquisition of an incoming bit stream, receiving apparatus examines the bit stream for an error-free synchronization code word. After obtaining synchronization, the receiver utilizes the inherent error correction capability offered by the BCH code to correct up to two errors in each synchronization code word. Each synchronization code word is then decoded to determine the location of the next synchronization code word. If more than two errors are detected in a synchronization code word, the receiver assumes that synchronization has been lost and it reexamines the incoming digital signal to recover synchronization upon the occurrence of the next error-free synchronization code word.

Two illustrative embodiments of receiving apparatus, in accordance with the invention, generally function in the above-recited fashion. In the first of the embodiments, delayed blocks of information signals are supplied to a utilization circuit. The examination and decoding of the synchronization code word is performed during the interval that the information signals are delayed. This operation entails correcting errors occurring in the received synchronization code word and decoding the corrected version thereof. The operation further entails generating an output synchronization pulse. This synchronization pulse is then supplied to the utilization circuit to mark the beginning of each data frame comprising a synchronization code word and a block of message information.

In the second illustrative embodiment, the incoming signal is first stored in a buffer and then acquired from store during operation. This latter embodiment is ideally suited to a television scanning format and its operation hereafter will be discussed in this context. Each synchronization code word is acquired from the buffer store and processed during the horizontal retrace interval. At the beginning of each horizontal scan line, a block of information signals, as determined by the decoded synchronization word, is read out of the buffer. Each block of information is acquired from store at regularly occurring intervals corresponding to the initiation of each horizontal scan line and is utilized to update the details within each video line.

A particularly advantageous feature of the invention is the highly flexible format it provides for the transmission of digital video signals over digital data systems (e.g., PICTUREPHONE signal transmission over the Bell System's T1 and T2 Carrier Systems).

BRIEF DESCRIPTION OF THE DRAWINGS

These and other objects and features of the invention will be more readily appreciated and better understood by reference to the following detailed description which should be considered in conjunction with the accompanying drawings in which.

DETAILED DESCRIPTION

Figure 1:
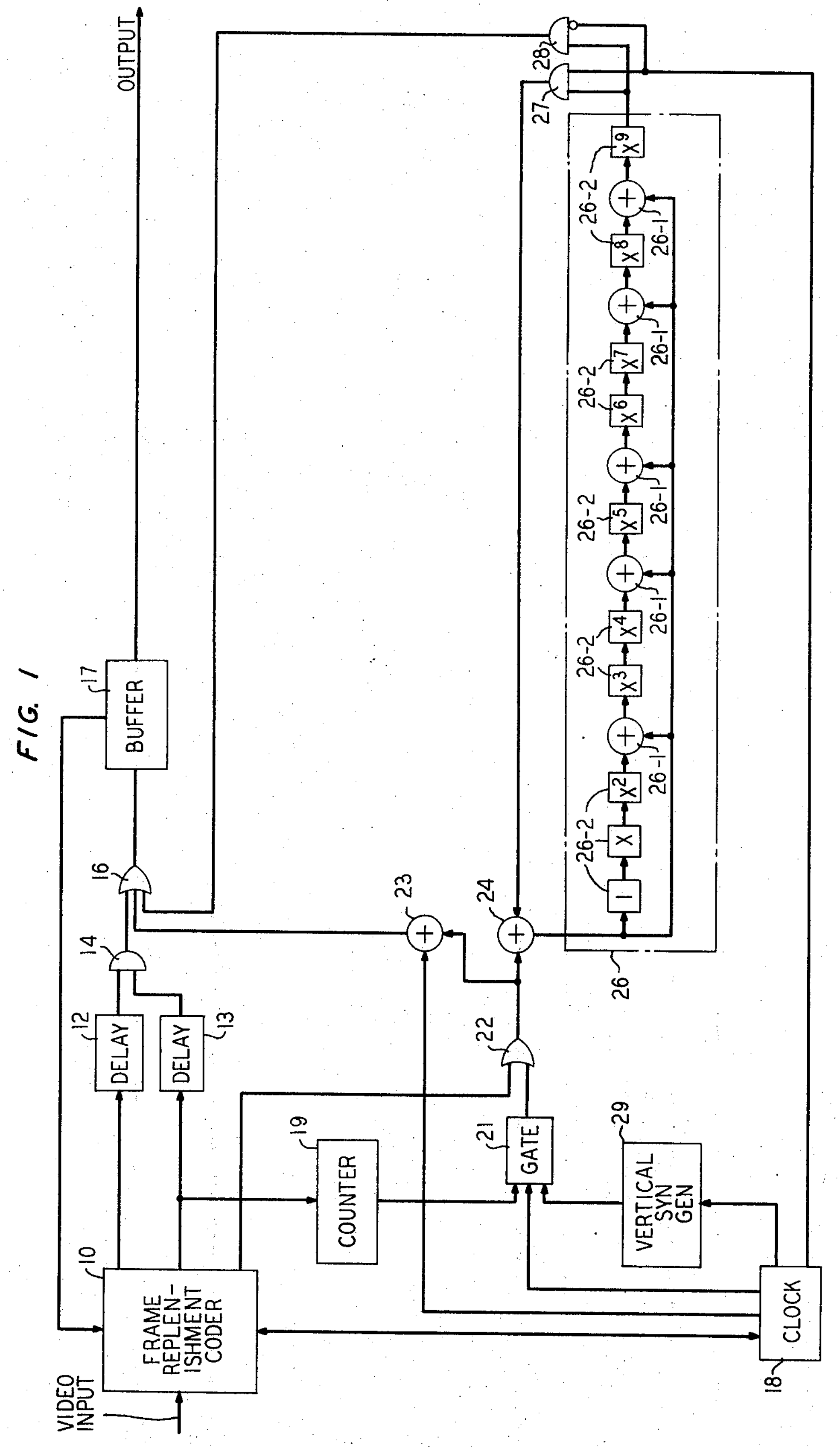
FIG. 1 is a schematic block diagram of an illustrative transmitter in accordance with the invention.

Referring now more particularly to FIG. 1, there is shown a block diagram of a transmitter according to the invention. A video signal is applied to the transmitter of FIG. 1, which supplies at the output a constant rate bit stream of digital signals. This output bit stream comprises variable length blocks of message signals separated by synchronization code words. For illustrative purposes, such signals are assumed to represent updated information of a video signal in pulse code, for subsequent utilization at some remote video receiver. In such a case, new information for each video line is grouped into a single block.

At the input of the transmitter of FIG. 1, coder 10 eliminates redundant video information from its analog video input and provides an output digital signal of variable length representing updated information for the appropriate picture in a video raster. Address information is also included with the updated information to indicate its location within each video line. Such coders are state of the art and are generally known as "conditional replenishment coders." See "A Video Encoding System with Conditional Picture-Element Replenishment" by F. W. Mounts, in the Bell System Technical Journal, Vol. 48 No. 7, Se. 1969, pages 2545–2554, wherein FIG. 1 depicts a conditional replenishment coder similar to coder 10. In addition, an article entitled "Transmitting Television as Clusters of Frame-to-Frame Differences" by J. C. Candy, Mrs. M. A. Franke, B. G. Haskell and F. W. Mounts appearing in the Bell System Technical Journal, Vol. 50, No. 6, July-August 1971, pages 1889–1917, redundancy reduction techniques and their implementation suitable for purposes of the coder used in conjunction with this invention are described. Such a coder can utilize more than one mode of reducing redundancy. For example, typical modes described in the above-mentioned article are frame-to-frame difference encoding, subsample encoding, and forced updating. The most efficient mode for reducing redundancy can be selected for each line of information in the video raster. This encoding mode is indicated by a 3-bit mode flag which is supplied to gate 22.

Due to the very effective elimination of redundant information by coder 10, video words and the accompanying address words are applied to delay 12 usually during only a small portion of the active scan time. Typically, the updated information in a video signal usually occurs in clusters crowded near brightness edges of moving objects. The address information therefore can be utilized more efficiently for groups rather than individual words. Between the occurrence of these digital words, the signal present at the output of coder 10 may be thought of as a string of logical zeros. Such signals are meaningless and therefore coder 10 provides a gating signal to distinguish the meaningless zeros from those zeros (and of course logical ones) actually required to update the remote receiver. In this case, for each signal bit required to represent updated information, a corresponding pulse in the gating signal is applied to delay 13.

After propagation through respective delays 12 and 13, the serial update and address information is applied to one input of AND gate 14 with the gating signal applied to the other. The two delays 12 and 13 are identical and they are of sufficient length so as to contain a complete line of video information plus a time equivalent to a part or all of the horizontal retrace period. The generation of the synchronization code word, to be described hereinafter, occurs during this retrace period. In other applications of this invention involving the synchronization of other than video signals, delays 12 and 13 must have a capacity in excess of that necessary to contain a block of information of maximum length. Here again, the synchronization code word processing occurs during this excess period. As the two signals emerge from the respective delays, AND gate 14 serves to inhibit the meaningless zeros from passing through OR gate 16 to buffer 17. This process is repeated for each block of information, which in this illustrative application of the invention are generated during the active portion of each horizontal scan line, so as to supply buffer 17 with updated and address signals in accordance with the output of coder 10. The information contained in buffer 17 is then read out and transmitted at a constant rate. For situations which may require a great deal of updated information, buffer 17 is provided with a feedback path for signaling coder 10 to prevent buffer overflow. It should be noted that coder 10 and a clock 18 cooperate to supply the required internal synchronization of coder 10. The clock also generates other timing for the purposes to be described hereinafter.

The procedure for supplying the synchronization words to buffer 17 will now be described. As already mentioned, there is a corresponding pulse in the gating signal applied to delay 13 for each signal bit emitted by coder 10. These pulses are also applied to counter 19 which supplies an 11-bit digital word at the end of each block of gating pulses as it enters delay 13. The 11-bit word is indicative of the total number of signal bits contained in the message block. Since the amount of propagation delay introduced by delays 12 and 13 is sufficient to contain a complete block of maximum length, it should be apparent that the output of counter 19, indicating the total number of bits required to update each video line, is available before the actual information bits emerge from the delayed path. Counter 19 serves to provide the location information, which indicates the spacing between successive synchronization code words, that is subsequently included in the synchronization code word. Upon the occurrence of a gating pulse produced by clock 18, gate circuit 21 is enabled to supply this 11-bit word to OR gate 22. Gate 22 passes the 11-bit word to modulo-2adders ("EXCLUSIVE OR" logic devices) 23 and 24. As the first bit of the 11-bit word passes through adder 23, clock 18 produces a pulse signal which serves to invert this bit. At the end of the 11-bit word, coder 10 supplies the 3-bit mode flag to gate 22. This total of 14 bits of information with the first bit inverted are read into buffer 17. The inversion of the first bit alters the cyclical characteristic of the transmitted synchronization code word so that it can be recognized by the remote receiver when it requires synchronization. The 14 bits, without any inversions, are read into the feedforward shift register 26 at the same time. During this read-in period, clock 18 also produces a pulse which enables AND gate 27. Accordingly, gate 27 completes the feedback path around shift register 26 via adder 24. The configuration of the feedforward paths in shift register 26 and the feedback path around it serve to derive a set of parity check bits from the set of information bits applied to it. After the 14 bits of information are read into shift register 26, the signal supplied by clock 18 to gate 27 changes level. This level shift then inhibits gate 27 and enables gate 28. While gate 28 is thus enabled, the parity check bits derived from the fourteen information bits, applied to shift register 26, are read into buffer 17 via gates 28 and 16. Buffer 17 therefore contains a complete synchronization code word comprising the 11-bit word produced by counter 19, the 3-bit mode flag supplied by coder 10, and a group of parity check bits (i.e., 10 bits) generated by shift register 26.

As a result of the delay introduced by delays 12 and 13, the complete synchronization code word is generated and read into buffer 17 during the aforementioned retrace period and before the new information for updating the video line is produced at the output of delay 12. Following the synchronization code word, this new information, from which the bit-count is derived to provide the synchronization code word is read into the buffer 17. Buffer 17 therefore contains a synchronization code word preceding each block of new information. The first 11 bits of the synchronization code word indicates the number of bits in the following block of message information and, hence, the location of the next successive synchronization code word. The next three bits of information in this synchronization word indicate the encoding mode used to provide the following block of message information, while the last ten bits are generated in accordance with a (24, 14) BCH error correction code. It is the parity check bits, derived from the information bits applied to shift register 26, which give the distinctive character to the synchronization code word that is advantageously utilized by the remote receiver which receives the transmitted digital bit stream containing predominantly message information. Such a receiver utilizes this distinctive characteristic to maintain synchronization and to detect the loss thereof.

Figure 5:
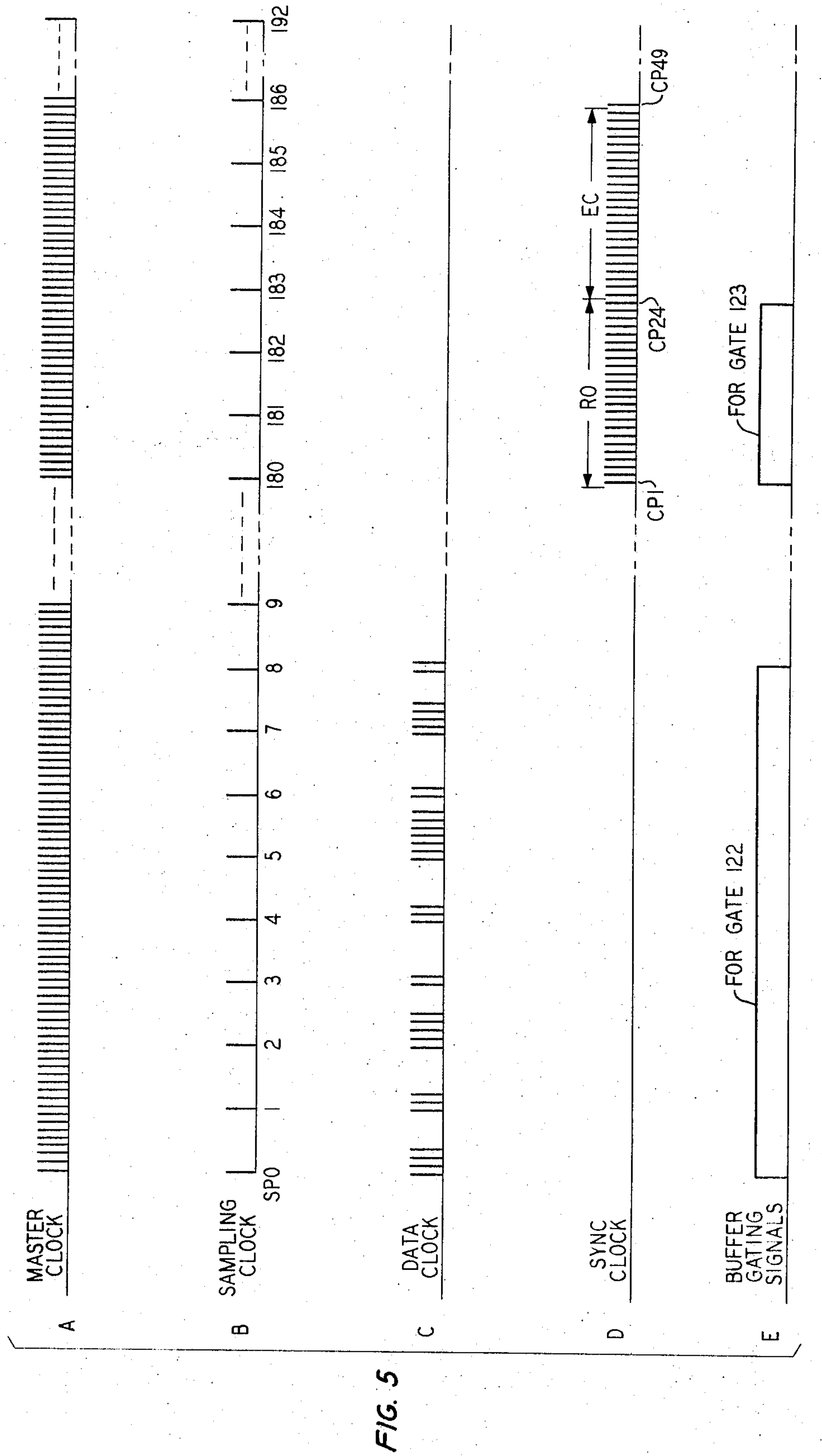
FIG. 5 depicts a timing diagram which is explanatory of the operation of the apparatus of FIGS. 4A and 4B.

Before further discussion of the operation of the transmitter of FIG. 1, it should be noted that shift register 26 is of a type familiar to those skilled in the art of algebraic coding theory. The register 26 comprises a feedforward arrangement of one unit register stages or delays, also called cells, and modulo-2 adders. The particular configuration of shift register 26 is determined by the error correction code advantageously selected for the synchronization code words. For example, in Algebraic Coding Theory by E. R. Berlekamp, McGraw-Hill Book Company, 1968, p. 138, a typical shift register encoder is depicted in FIG. 5.17 for a double error correcting BCH code that has 23 bits in each code word. The implementation of the shift register circuitry utilized in the transmitter of FIG. 1 is within the skill of one in the art after the information signal requirements are determined and the appropriate error correction code is selected. Before selection of an appropriate error correction code, the maximum block length must be known in order to choose a synchronization code that includes a sufficient number of information bits to indicate block length in binary form. For example, a maximum block length of 1,288 bits can be represented by 11 bits; i.e., 10 100 001 000. The mode of encoding, as previously mentioned is signaled by a 3-bit mode flag which is added to the 11-bit word. This total of 14 bits of information can then be used to generate 10 parity check bits in accordance with a (24, 14) BCH code. This code (24 bit word, 14 bits of information) is a shortened version of the (31, 21) BCH code. In Chapter 14 of the previously noted book by Berlekamp, the modification of error correcting codes is discussed. Although codes which offer greater than double error correcting ability might be used, the amount of additional redundancy to be transmitted in achieving this correction ability should be considered. Such a consideration should primarily be based upon a statistical analysis of the probability of loss of synchronization for a given channel bit error rate.

The shift register configuration for this (24, 14) BCH code is depicted in FIG. 1. The modulo-2 adders 26-1 are interleaved in the series connected register cells 26–2 in the manner shown in the Figure. The algebraic cell designations ($X, X^2, X^3$...) merely correspond to the powers of the generator polynomial of the BCH code.

Returning again to the operation of the transmitter of FIG. 1, it is apparent that the synchronization code word which precedes the update information for each line in the video signal also provides horizontal synchronization. As in conventional analog transmission of television, vertical synchronization information has to be transmitted between the last horizontal line of one field and the first horizontal line of the next field. If we assume the maximum block length is 10 100 001 000 (1288), predetermined 11-bit words for vertical synchronization, such as 11 100 000 001 and 11 100 000 000 for the odd and even fields, respectively, can be inserted by vertical synchronization generator 29 without producing any ambiguity with the first 11-bits of the normal horizontal synchronization code words. When a vertical synchronization code word is received, the remote receiver assumes a zero block length, while block length information is contained in the other synchronization code words that provide horizontal synchronization. If the transmitter of FIG. 1 is utilized to transmit digital signals which represent something other than video information, the predetermined synchronization words may be used to indicate some particular aspect or feature of the transmitted signal, or may be eliminated entirely.

Figure 2A:
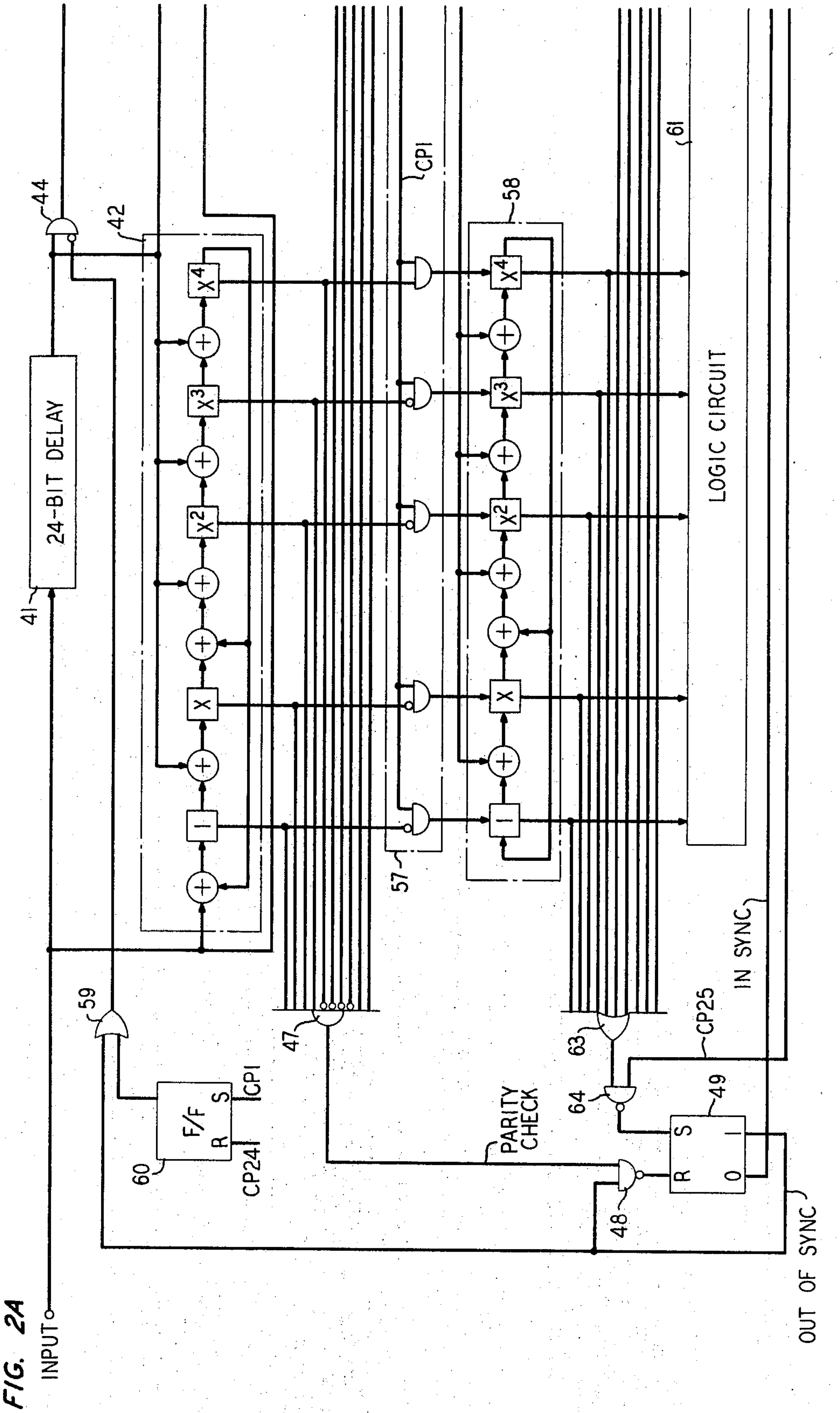
FIG. 2A and 2B, when aligned horizontally, illustrate receiving apparatus, in accordance with the invention, which can be utilized with the transmitter of FIG. 1.
Figure 2B:
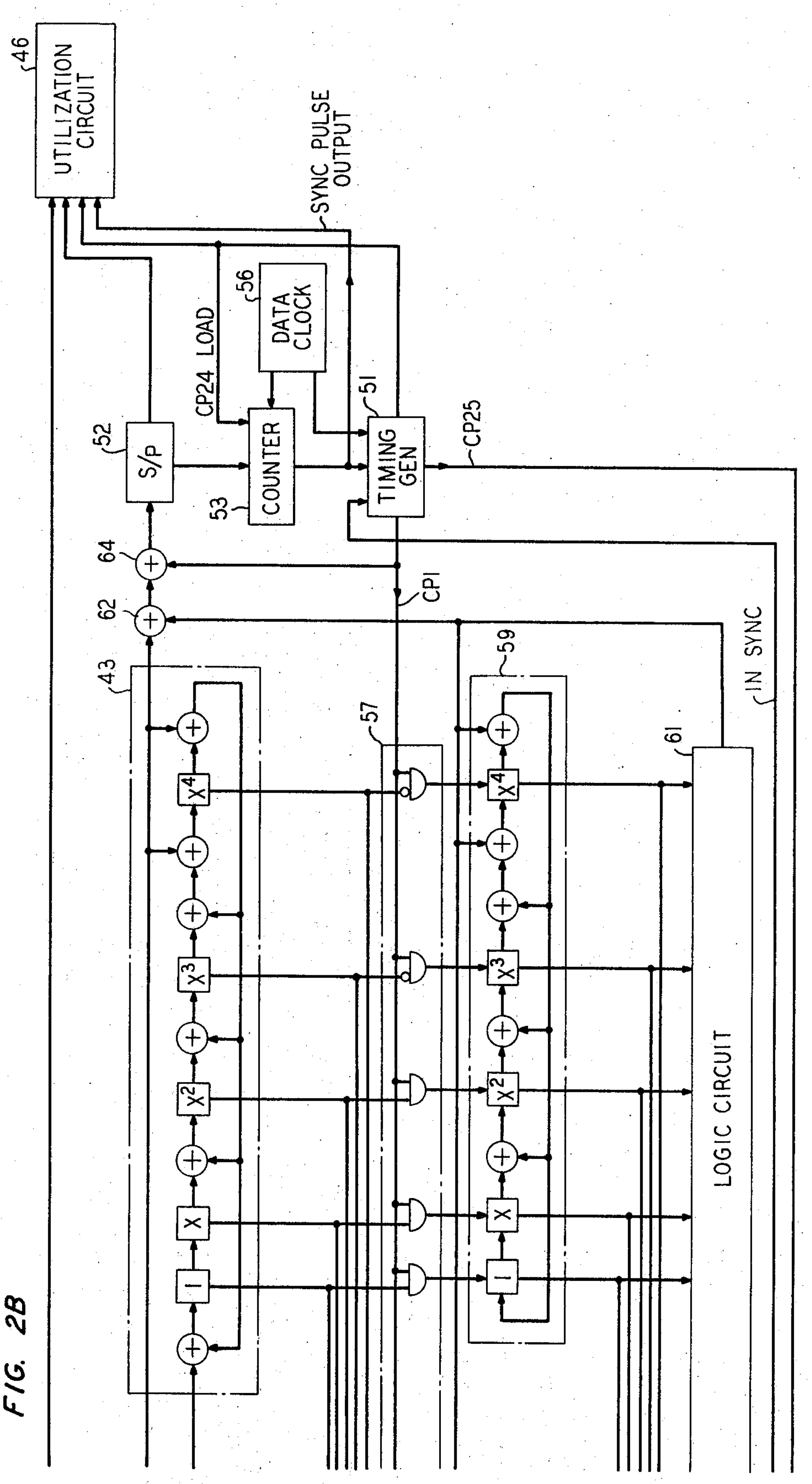

FIGS. 2A and 2B depict a variable block length synchronization receiver which may be used to receive the bit stream produced by the transmitter of FIG. 1. the received bit stream is applied to delay 41 and shift registers 42 and 43. The delayed output of delay 41 is also applied to shift registers 42 and 43, in the manner shown, and to gate 44. At this point, it will be assumed that synchronization has not yet been acquired and that the receiver of FIGS. 2A and 2B will proceed to acquire synchronization. Since utilization circuit 46 requires synchronization information to function properly, initially gate 44 inhibits the incoming information from being applied to the utilization circuit 46 until synchronization is acquired. The utilization circuit 46 typically contains digital-to-analog conversion circuitry and therefore is equipped to operate from the digital signals applied thereto.

The procedure for acquiring synchronization will now be described. The incoming bit stream is examined to find the location of an error-free synchronization word. This examination is performed by application of the incoming bit stream to shift registers 42 and 43 from both the input and output of delay 41. It should be noted that the delay interval of delay 41 is equal to the bit length of a synchronization code word; i.e., a 24-bit delay. The application of the output of delay 41 to the several modulo-2 adders of shift registers 42 and 43 eliminates that portion of the contents of the shift registers which was produced by the bits in the incoming bit stream that have already propagated through the delay. Therefore the contents of shift registers 42 and 43, at any given time, are only indicative of that portion of the incoming bit stream then propagating through delay 41. The contents of the register cells of shift registers 42 and 43 are applied to gate 47 which performs an inhibit-AND function. Upon the occurrence of the first error-free synchronization word in delay 41, the contents of shift registers 42 and 43 are such that gate 47 produces an output representative of a logical 1. The combined operation of delay 41, shift registers 42 and 43, and gate 47 thusly provides a continuous sliding parity check on the incoming bit stream to find an error-free synchronization code word. The output of gate 47 passes through enabled AND gate 48 to change the state of flipflop 49. Gate 48 is enabled by flip-flop 49 when it is in a state indicative of an "out-of-sync" condition. The newly acquired state of flip-flop 49 indicates that synchronization has been acquired and will be referred to hereinafter as an "in-sync" condition.

The registers 42 and 43 of the receiver each comprise modulo-2 adders interleaved in the series connected register cells of the respective registers, in the manner shown in FIGS. 2A and 2B. The registers 42 and 43 comprise a total number of cells (i.e., 10) equivalent to the number of parity bits (10) of the selected (24, 14) BCH code. As is known in the art of algebraic coding theory, shift registers 42 and 43 of the receiver divide by minimum factors of the generator polynomial to each produce a sequence of signals. These sequences of signals are known as the residues or remainders and contain information indicative of the absence or presence of errors in the received synchronization word contained in delay 41. Thus, when, and only when, an error-free code word is temporarily stored in delay 41, the gate 47 connected to the shift register cells, as depicted in FIGS. 2A and 2B, will be enabled to provide a logical 1 output signal. The configuration of the register 42 and 43 and the gate 47 connections thereto are in accordance with the selected BCH error correction code and the circuit design thereof should be familiar to those skilled in the art of algebraic coding given the parameters of the information signal content and the selected BCH code.

Figure 3:
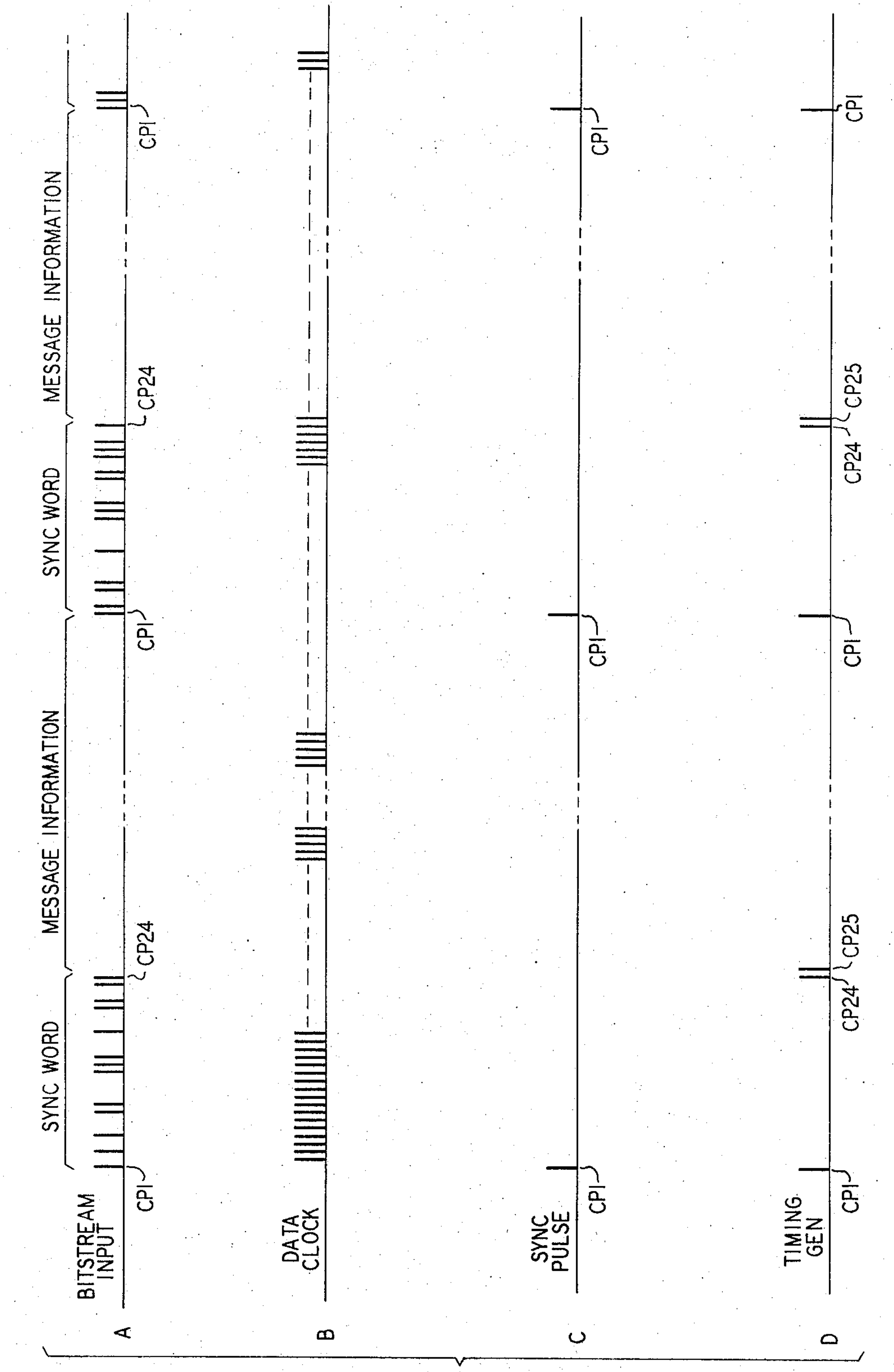
FIG. 3 depicts a timing diagram useful in explaining the operation of the apparatus of FIGS. 2A and 2B.

With synchronization thus acquired, the operation of the circuitry in FIGS. 2A and 2B will be described with reference to FIG. 3. In FIG. 3, line A represents the incoming bit stream which shows each synchronization word, followed by a variable length block of message information. Line A of FIG. 3 is depicted to represent the digital bit stream as it emerges from delay 41. The "in-sync" condition indicated by the output of flip-flop 49 triggers timing generator 51. Timing generator 51 emits a first pulse, designated CP1, that gates the contents of shift registers 42 and 43 into shift registers 58 and 59 via gating network 57. It should be noted that gating network 57 is designed to invert certain bits in the manner indicated by FIGS. 2A and 2B. These inversions serve to modify the contents of the shift registers upon transfer such that the effect of the inverted first bit in the synchronization code word is eliminated therefrom. Concurrently, CP1 is also applied to modulo-2 adder 64 to reinvert the first bit of the synchronization code word before its application to serial-to-parallel converter 52. Timing generator 51 then produces a delayed output pulse. The period that the output pulse is delayed is sufficient for the synchronization word from delay 41 to be serially loaded into converter 52 via adders 62 and 64.

The delayed output pulse of timing generator 51, which is designated as CP24, signals counter 53 to accept a parallel transfer at the end of this output pulse of the first 11 bits of the synchronization code word present in serial-to-parallel converter 52. This parallel transfer presets counter 53 to a quantity indicative of the number of information bits contained in the following block of information. At the same time, the next three bits in the synchronization code word are applied to utilization circuit 46 to indicate the mode of encoding used to form that block of message information. Counter 53 then proceeds to backward count or down-count from its preset condition, one increment for each pulse supplied by data clock 56. At the end of the count, counter 53 signals timing generator 51 to indicate that the next succeeding synchronization code word has just been applied to shift registers 42 and 43. The interaction of these circuit components will subsequently be more fully explained with reference to the other portions of FIG. 3.

Referring to line B of FIG. 3, it can be seen that the output of data clock 56 runs at the same bit rate as the incoming bit stream in line A. Accordingly, counter 53 down counts at the same rate that the message information bits are applied to utilization circuit 46 through gate 44 which is enabled by the "in-sync" indication from flip-flop 49. When the number of pulses produced by data clock 56 reduces the count to zero, counter 53 produces a pulse output. This output pulse, designated CP1 in line C of FIG. 3, is applied to utilization circuit 46 and to timing generator 51. It should be noted that each bit of information in the incoming bit stream occupies a time slot which is equivalent to a clocking period (CP) of data clock 56. Pulse CP1, in line C of FIG. 3, marks the beginning of the next data frame comprising a sync word and variable block of message information. Pulse CP1 also sets the timing generator 51, which later produces pulse CP24. The pulse CP1 from counter 53 provides the horizontal synchronization information to utilization circuit 46 and is used as a basis on which timing generator 51 produces a series of time related pulses to control the sequential gating functions of the apparatus in FIGS. 2A and 2B. Upon the occurrence of CP24 at the utilization circuit 46, it accepts the 3-bit mode flag from serial-to-parallel converter 52. The complete output of timing generator 51, including pulse CP24, is shown in line D of FIG. 3. The use of CP1 and CP25, which are also produced by timing generator 51, will be discussed hereinafter.

The receiver in FIGS. 2A and 2B now employs its attendant error correction ability in examining the next synchronization word. At the end of the backward count, counter 53 indicates the location of the next synchronization word by triggering the timing generator 51. The timing generator immediately produces a pulse output during the first clocking period. This pulse, designated CP1, enables AND gate network 57. This allows the contents of shift registers 42 and 43 to be transferred, respectively, to shift registers 58 and 59.

The shift registers 58 and 59 comprise modulo-2 adders interleaved in the series connected register cells of the respective registers in the manner shown in FIGS. 2A and 2B. It will be evident that the shift registers 58 and 59 correspond in configuration to the shift registers 42 and 43, respectively, except for the modulo-2 adders at the input of the latter registers. The bits deposited in shift registers 58 and 59 in the manner described hereinbefore are then shifted through the registers, under internal clocking and at a rate that corresponds to the incoming line bit rate. The output of the cells of shift registers 58 and 59 are applied to the logic circuit 61 for error detection purposes.

The logic circuit 61 serves to examine the bit information delivered thereto from the registers as the bits stored in the latter are successively shifted in position. The basic function of the logic circuit 61 is to ascertain the occurrence of an error in the received synchronization code word by examining the stored bits for each one of the successive shifts. When an error is indicated in the contents of shift registers 58 and 59, the logic circuit 61 serves to produce an output correction signal. This error examination of the synchronization code word is performed 24 times, once for each of the bits in the 24-bit synchronization code word. As each bit of the synchronization code word emerges from delay 41 and is applied to modulo-2 adder 62 the shift registers 58 and 59 and logic circuit 61 act in combination to determine if there is an error in that bit position. If an error is so indicated, the logic circuit 61 then generates an output correction signal which is applied to the modulo-2 adder 62 for the purpose of correcting that particular bit which was in error. The correction signal is also fed back to selected modulo-2 adders of registers 58 and 59 in the manner shown in the drawings. The purpose of this feedback is to eliminate that portion of the information contained in the shift registers which indicated that there was an error in that bit position.

The shift registers 58 and 59 and logic circuit 61 comprise an error detection decoder similar to those well known and described in the art. Such decoders have been extensively covered in the literature and hence further detailed explanation thereof is not believed warranted; see, for example, the article entitled "Error Correction Codes and Their Implementation for Data Transmission Systems," by J. E. Meggitt, IRE Transactions on Information Theory, October 1961, pages 234–244. As will be evident to those in the art, because of the BCH code selected, the decoder of FIGS. 2A and 2B will only be capable of correcting for two or less errors in each synchronization code word. Accordingly, as a synchronization code word emerges from delay 41 with one or two digit errors therein, the same is corrected for at modulo-2 adder 62 prior to the delivery of the synchronization word to the serial-to-parallel converter 52.

Referring now to the counting period or interval of counter 53, the update or message information of the incoming bit stream is applied during this interval to utilization circuit 46, through AND gate 44, from the output of delay 41. When the backward count reaches zero, counter 53 produces a pulse for the next clocking period to indicate the beginning of a new data frame. This pulse is applied to utilization circuit 46 and timing generator 51. The timing generator, in turn, produces pulses during the first, 24 and 25 clocking periods. These pulses, as noted previously, are depicted in line D of FIG. 3. The pulse during the first clocking period of timing generator 51 is applied to flip-flop 60. This sets flip-flop 60 to produce a 1 output. The 1 output of flip-flop 60 passes through OR gate 59 to inhibit AND gate 44. Gate 44 remains inhibited until pulse CP24 resets flip-flop 60. The output of flip-flop 60 therefore remains high or in its 1 state from the first clocking period through the twenty-fourth clocking period to provide an interval for inhibiting gate 44 so as to prevent the application of the synchronization code word to utilization circuit 46.

The process of error correcting successive synchronization code words, as described above, continues as long as no more than two errors are contained in each synchronization code word, and, as described, the information in the shift registers 58 and 59 indicative of these errors is removed by a correction signal from logic circuit 61. Thus, shift registers 58 and 59 will typically contain all 0's after error correction is completed.

The operation of the receiver in FIGS. 2A and 2B will now be described when three errors occur in a synchronization word. Unlike the normal operation described in the foregoing, shift registers 58 and 59 will now contain some 1's after being clocked 24 times. Pulse CP25, which occurs during the next or 25th clocking period from the output of timing generator 51, is produced to check for an "out-of-sync" condition. Specifically, the contents of shift registers 58 and 59 which are applied to OR gate 63 are examined by flip-flop 49 upon the occurrence of pulse CP25 at AND gate 64. In response to any 1's in shift registers 58 and 59, flip-flop 49 changes state to indicate an "out-of-sync" condition. The change or "out-of-sync" output signal of flip-flop 49 is applied to AND gate 48 and OR gate 59. The signal applied to OR gate 59 passes through it and inhibits AND gate 44, which prevents the application of the received signal to utilization circuit 46. Gate 44 remains inhibited until the first occurrence of a succeeding error-free synchronization word, which is indicated by the logical 1 output of gate 47. The logical 1 passes through AND gate 48, which was enabled by the "out-of-sync" state of flip-flop 49. Flip-flop 49 thus changes state in response to this new signal to indicate that synchronization has again been acquired.

Figure 4A:
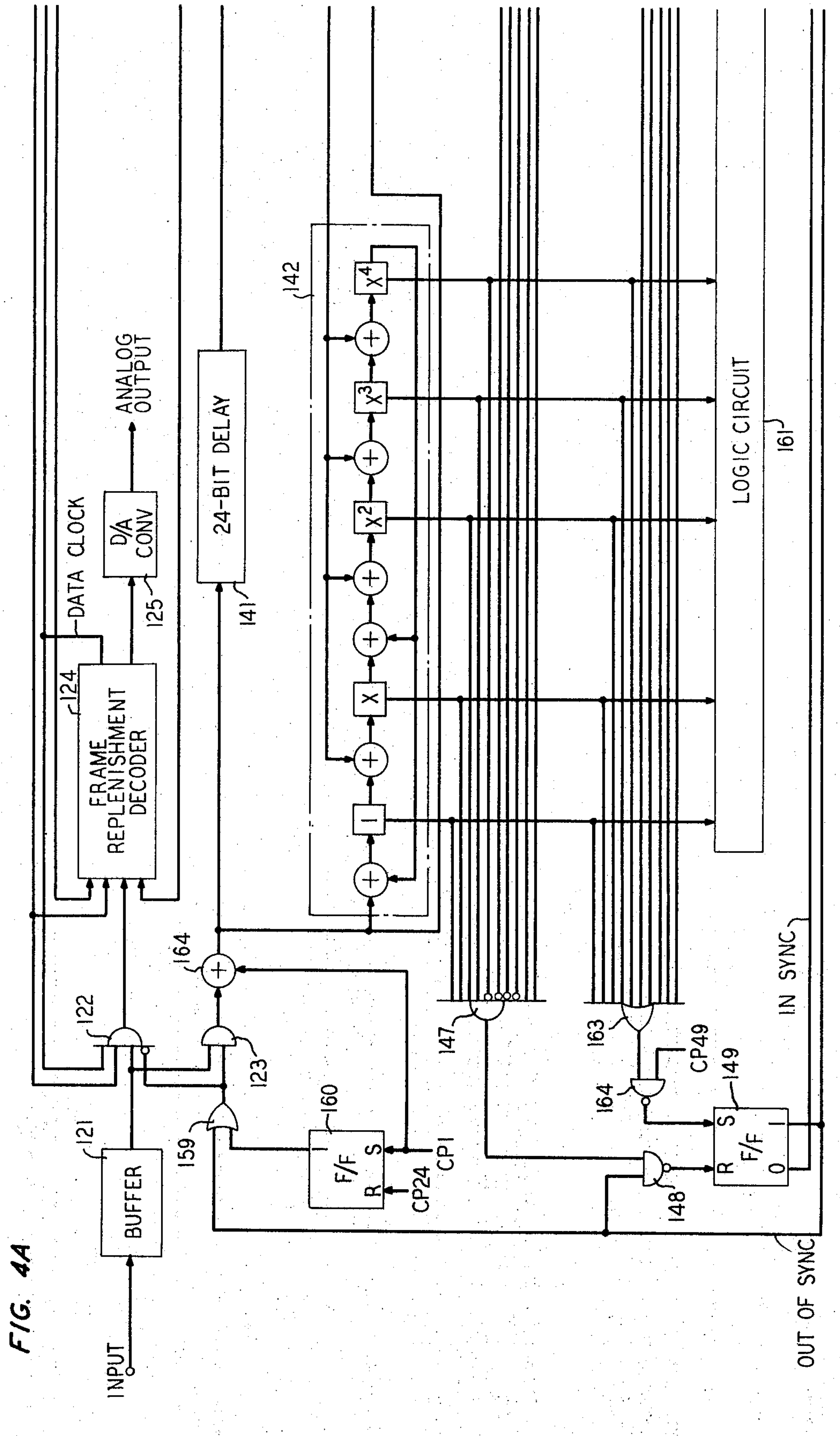
FIG. 4A and 4B, when aligned horizontally, illustrate receiving apparatus which can be utilized, in the transmission of PICTUREPHONE signals, for synchronization to the signals emitted by the transmitter of FIG. 1.
Figure 4B:
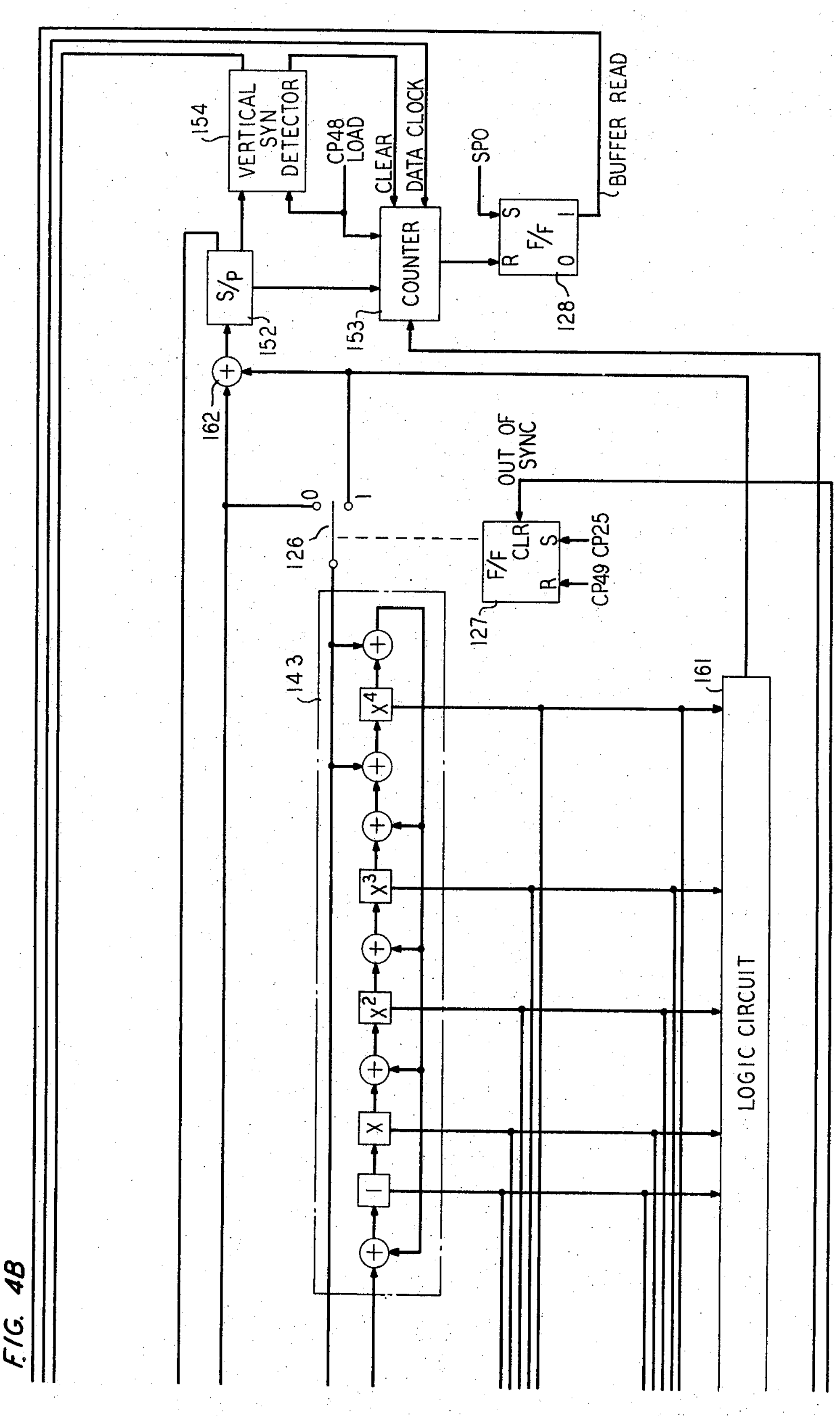

FIGS. 4A and 4B show a block diagram of a receiver embodiment specifically adapted to operate with PICTUREPHONE signals that are transmitted in a variable block format from a transmitter such as illustrated in FIG. 1. At the outset, it should be recognized that the receiver of FIGS. 4A and 4B functions in a manner basically similar to the operation of the receiver in FIGS. 2A and 2B. This basic operation involves: (1) obtaining synchronization upon the occurrence of the first error-free synchronization word in the incoming bit stream; (2) maintaining synchronization by correcting up to two errors in each synchronization word and then decoding each received synchronization word; and (3) assuming a loss of synchronization upon the detection of three or more errors in a received synhcronization word to re-initiate the reacquisition of synchronization upon the occurrence of the next error-free synchronization word.

To facilitate an explanation of the apparatus in FIGS. 4A and 4B, the elements therein are assigned the same last two digits in their reference numerals as the respective elements of FIGS. 2A and 2B which perform an identical or an analogous function. A principal difference in the PICTUREPHONE receiver is that the incoming bit stream is first applied to buffer 121 and obtained therefrom, as required, through gates 122 and 123. Before synchronization has been acquired, gate 122 is inhibited, while gate 123 is enabled by the "out-of-sync" output signal of flip-flop 149 passing through OR gate 159. This allows the output of buffer 121 to be applied to delay 141 and shift registers 142 and 143. Switch 126, located in a feedback path of shift registers 142 and 143, selects either the output of delay 141 or the output of logic circuit 161 for application to selected modulo-2 adders as shown in FIGS. 4A and 4B. Switch 126 is controlled by flip-flop 127. Prior to acquiring synchronization, flip-flop 127, acting in response to the "out-of-sync" output of flip-flop 149, places switch 126 in the position designated 0. Delay 141, gate 147 and shift registers 142 and 143 then function to perform a sliding partiy check on the incoming bit stream to find the first error-free synchronization word. When delay 141 contains an error-free synchronization word, the contents of shift registers 142 and 143 are such that gate 147 produces a logical 1 output. The output of gate 147 is applied to flip-flop 149 via enabled AND gate 148. This logical 1 output switches flip-flop 149 to a state indicative of an in-synchronization condition. The "in-sync" output of flip-flop 149 triggers counter 153 to prepare it to load. At this point, logic circuit 161 evaluates the contents of shift registers 142 and 143 and ascertains that the inversion of the first bit of the synchronization code word is an error. Logic circuit 161 therefore provides a correction signal that inverts the first bit at modulo-2 adder 162 before it is serially loaded into converter 152. From this point in the description forward, the operation of the receiver in FIGS. 4A and 4B will be described in terms of the television synchronization format illustrated in FIG. 5.

Now referring to FIG. 5, line A shows the output of a master clock (not shown) that runs at a predetermined rate. This pulse rate is the maximum speed at which information can be read out of buffer 121. Line B of FIG. 5 depicts the output of a sampling clock (not shown) that divides a horizontal scan interval of a television raster into segments. Each segment is designated in line B to represent a sampling period (SP) for displaying a picture element in the television picture. During each sampling period, one digital word indicative of the brightness of one picture element is read out of buffer 121. The pulse rate of line A is eight times faster than the pulse rate of line B. Thus, up to eight signal bits can be read out of buffer 121 within one sampling period. For illustrative purposes, line C in FIG. 5 shows only eight sampling periods during which update information is obtained from buffer 121. In this case, each horizontal scanning interval includes 192 sampling periods, of which only 160 are active sampling intervals containing either old or new video information. The remaining 32 sampling periods are inactive since they occur during the horizontal retrace interval. The pulses of line A and line B are produced by external television receiver circuitry, not shown in FIGS. 4A and 4B for the sake of simplicity. It should also be noted that the horizontal scan line illustrated in FIG. 5 has been compressed by not showing sampling periods from nine up to 180. This particular television format corresponds to that used in PICTUREPHONE systems. It should, however, be understood that the receiver of FIGS. 4A and 4B is equally adaptive to any other television format.

Since synchronization has already been achieved, the message information contained in buffer 121 is read out as needed during the active portion of the television picture. For each bit of message information, the data clock output of frame replenishment decoder 124 produces a pulse. These pulses are shown in line C of FIG. 5.

The frame replenishment decoder 124 accepts the variable length words of the message information produced by the transmitter of FIG. 1. Decoder 124 accepts each bit and evaluates that bit in combination with preceding bits of the same sampling period to ascertain the presence of a variable length message word. When any signal bit combination does not correspond to a variable length message word, decoder 124 produces a pulse signal, designated as the data clock, and depicted in line C of FIG. 5, which serves to obtain an additional signal bit from buffer 121. This procedure is continued until the signal bit combination corresponds to a variable length message word. The data clock signal thus contains a corresponding pulse for all the signal bits present in each digital message word. The other output signal comprises an equivalent fixed digital word (e.g., 8-bit word) for each variable length message word. These message words are decoded in accordance with the 3-bit mode flag supplied by serial-to-parallel converter 152.

Before message information is read out of buffer 121, however, counter 153 is preset by the trailing edge of pulse CP48, in accordance with a 11-bit word provided by serial-to-parallel converter 152. It should be noted that pulse CP48, in this case, is referenced to the incoming bit stream as it enters delay 141. Thus, the timing sequence of CP48 in FIG. 5 is equivalent to CP24 in FIG. 3. At the beginning of the horizontal scan line, pulse SPO from the sampling clock (not shown) is applied to flip-flop 128. This changes the state of flip-flop 128 such that it starts the beginning of a buffer read signal, which is applied to gate 122. The output signal stays high until flip-flop 128 is reset by counter 153. This occurs at the end of the block of message information. Accordingly, flip-flop 128 produces a pulse of sufficient duration to read out an entire block of updated message information.

During the interval of the buffer read pulse, that data clock signal in line C of FIG. 5 is gated with it to read the message information out of buffer 121 one bit at a time. As the message bits are read out, decoder 124 examines them to ascertain the shortest signal bit combination indicative of a variable length word. Once such a word combination is found to be present in a sampling interval, the next message bit is not read out of buffer 121 until the next sampling period. Counter 153 thus proceeds to backward count one increment for each information it as signaled by the data clock output of decoder 124. Decoder 124 places the serial message information at positions in the horizontal scan line in accordance with address signals included in the message information. It should be understood that decoder 124 has memory circuitry which contains previously transmitted messsage information. A decoder similar to decoder 124 is depicted in FIG. 3 of the previously cited article written by F. W. Mounts. The new update information is therefore added to the previous information such that decoder 124 produces a continuous output of fixed digital words for the complete horizontal scan line wherein each digital word is indicative of the brightness of a picture element in the scan line. The digital output of decoder 124 is applied to digital-to-analog converter 125, which reconstructs the analog video signal. The process of reading information out of buffer 121 only continues until the backward count of counter 153 reaches zero and resets flip-flop 128, which may or may not correspond to the end of the scan line, while the combination of decoder 124 and converter 125 will continue to provide the analog video signal up to the end of the horizontal scan line.

If any of the received synchronization code words corresponds to one of the two predetermined vertical synchronization code words produced by vertical synchronization generator 29 in the transmitter of FIG. 1, vertical synchronization detector 154 will detect their occurrence and, in turn, provide an analog vertical synchronization waveform indicative of the particular vertical synchronization code word that did occur to decoder 124. Upon the occurrence of these vertical synchronization code words detector 154 also provides a pulse which clears counter 153, indicating that the block length is zero and no information is to be obtained from buffer 121 for updating.

After the requisite information bits corresponding to a block of information are read out of buffer 121, which may be from zero to a complete line, the next successive twenty-four bits to be read out of the buffer comprise the next synchronization word. During the interval RO, pulses CP1 through CP24 are produced, as depicted in line 5 of FIG. 5. This is the interval that flip-flop 160 produces the logical 1 output shown in line E of FIG. 5 to enable AND gate 123 through gate 159 and correspondingly to inhibit gate 122. The synchonization code word is then read out to buffer 121 by gate 123 into delay 141 via modulo-2 adder 164. After synchronization is acquired, adder 164 serves to reinvert the inverted first bit of the synchronization code word upon the occurrence of CP1 before application to shift registers 142 and 143. Upon initial acquisition of synchronization, however, the inverted first bit is detected and corrected as an error by logic circuit 161. This is due to the fact that CP1 is not available when synchronization is first acquired and that flip-flop 149 rather than flip-flop 160 produces the enabling signal which is applied to AND gate 123 via OR gate 159. After the synchronization code word is read out of buffer 121 via gate 123, shift registers 142 and 143 produce a set of signals indicative of the presence or absence of any errors in the 24 signal bits comprising the synchronization code word then propagating through delay 141. During the next interval, designated EC in line D of FIG. 5, the synchronization code word is read out of delay 141 via modulo-2 adder 162 into serial-to-parallel converter 152.

During the interval EC, logic circuit 161 evaluates the set of signals stored in shift registers 142 and 143 once for each clocking period as the contents therein are successively shifted through shift registers 142 and 143. Switch 126, under the control of flip-flop 127, at this time is placed in the position designated 1 in FIGS. 4A and 4B. If during any one of the clocking periods the contents of shift registers 142 and 143 are such that when evaluated by logic circuit 161 indicate an error, a correction signal is accordingly produced. This correction signal is therefore applied to modulo-2 adder 162 to eliminate the error before the synchronization code word is placed into serial-to-parallel converter 152. The same correction signal is also applied to selected modulo-2 adders in shift registers 142 and 143, as shown in FIGS. 4A and 4B. This signal eliminates that portion of the contents of the two shift registers which indicated the error to be corrected. It therefore becomes readily apparent that shift registers 142 and 143 perform the dual functions of the sliding parity check when switch 126 is in the 0 position and the error decoding function when switch 126 is in position 1.

The foregoing process continues until the occurrence of three errors in a synchronization word. As previously described, this condition in the synchronization word is responsible for the occurrence of some 1's in shift registers 142 and 143 at the end of the correction process. When pulse CP49 is applied to AND gate 164, the contents of shift registers 142 and 143 produce an output at gate 163. If any 1's are in the shift registers, AND gate 164 becomes enabled, changing flip-flop 149 to a state indicative of an "out-of-sync" condition. The receiver then proceeds to re-acquire synchronization. Once synchronization has been achieved, synchronization will be maintained from one synchronization word to the next as described in the foregoing until the occurrence of a synchronization word containing three or more errors.

It should be understood that although the application of the invention has been discussed primarily in terms of synchronizing digital video signals, the application of the invention is not restricted to the synchronization of only video signals. The invention is equally adaptive to other types of variable block length message signals. For example, this invention is applicable to the framing of multichannel pulse code modulation systems. In this example, the portion of the synchronization word designated to indicate the mode of encoding may instead be used to identify channel selection. Furthermore, the limitation of the maximum predetermined block length is only a function of the particular error correction code chosen in the illustrative embodiment of the invention. Other BCH codes and, indeed, other types of error correction codes might be utilized in accordance with the invention.

Accordingly, it is to be understood that the arrangements described in the foregoing are merely illustrative of the application of the principles of the present invention. Numerous and varied other arrangements may be utilized by those skilled in the art without departing from the spirit and scope of the invention.

We claim:

1. In a variable block length synchronization system for use in the transmission of digital bits of message information grouped in blocks of highly variable length, counting means for producing an output signal indicative of the number of bits in each block of message information;

encoding means responsive to the output of said counting means to produce an error correction synchronization word that includes information as to the number of bits in each block of message information; and means for combining the synchronization words of said encoding means with the variable length blocks of message information to form a digital bit stream wherein each synchronization word precedes a block of message information, each synchronization word serving to indicate the bit-length of the succeeding block of message information so that the location of the next successive synchronization word can be determined.

2. A synchronization system as defined in claim 1 wherein said error correction synchronization word is encoded in accordance with a (24, 14) Bose-Chaudhuri-Hocquenghem error correction code.

3. A synchronization system as defined in claim 2 including means for inverting the first bit of each synchronization code word.

4. A synchronization system as defined in claim 3 wherein said encoding means comprises a shift register having a series of ten register cells and modulo-2 adders interleaved in predetermined positions in said series in accordance with the generator polynominal of said (24, 14) error correction code, said shift register serving to generate the ten parity bits of said (24, 14) error correction code.

5. A variable block length synchronization system comprising transmitting means for producing a constant rate bit stream of serially alternating error correction encoded synchronization words and variable length blocks of information signals, each one of said synchronization words precediing a block of information signals and serving to indicate the bit-length of the same to thereby locate the position of the next successive synchronization word at the end of the block; and means for receiving said bit stream comprising, storage means for delaying the propagation of said bit stream for a period of time equal to the time duration of said synchronization words, shift register means having the input signal and output signal of said storage means applied thereto for producing in response a set of signals indicative of the errors if any present in each synchronization word, logic means for evaluating said set of signals to correct any two errors occurring in each synchronization word, and decoding means coupled to said storage means for evaluating each synchronization word to locate the next successive synchronization word in said bit stream.

6. A variable block length synchronization system in accordance with claim 5 wherein said receiving means further comprises gating means connected to said shift register means to produce an output signal indicative of the occurrence of an error-free synchronization word in said bit stream as indicated by said set of signals.

7. A variable block length synchronization system in accordance with claim 6 wherein said receiving means further comprises signal gating means connected to receive the bit stream output of said storage means, and bistable means for producing a control signal for said signal gating means such that said gating means is inhibited for an interval corresponding to the occurrence of synchronization words in said bit stream so as to produce an output signal comprising only blocks of information signals.

8. A variable block length synchronization system in accordance with claim 7 wherein said decoding means comprises counting means preset in accordance with the location information of each synchronization word for counting at the bit rate of said bit stream during the interval the block of information signals are received to produce an output signal indicative of the end of each block of information signals and thus the location of the next successive synchronization word in said bit stream.

* * * * *